US012781668B2

(12) United States Patent
Bellet et al.

(10) Patent No.: US 12,781,668 B2
(45) Date of Patent: Nov. 3, 2026

(54) SUPPORT MAST FOR A TURBOJET ENGINE WITH THRUST REVERSER

(71) Applicant: SAFRAN NACELLES, Gonfreville-I'Orcher (FR)

(72) Inventors: François Bellet, Moissy-Cramayel (FR); Fabien Charliac, Moissy-Cramayel (FR); Laurent Georges Valleroy, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 19/269,878

(22) Filed: Jul. 15, 2025

(65) Prior Publication Data

US 2026/0022661 A1 Jan. 22, 2026

(30) Foreign Application Priority Data

Jul. 18, 2024 (FR) ....................................... 2407860

(51) Int. Cl.
*F02C 7/20* (2006.01)
*F02K 1/12* (2006.01)

(52) U.S. Cl.
CPC .................. *F02C 7/20* (2013.01); *F02K 1/12* (2013.01); *F05D 2220/323* (2013.01)

(58) Field of Classification Search
CPC ..... F02C 7/20; F02K 1/12; F02K 1/72; F05D 2220/323; B64D 27/40; B64D 29/06
See application file for complete search history.

(56) References Cited

U.S. PATENT DOCUMENTS

| | | | | |
|---|---|---|---|---|
| 10,221,809 | B2 * | 3/2019 | Charron | B64D 29/06 |
| 12,024,305 | B2 * | 7/2024 | Alstad | B64D 27/10 |
| 12,540,589 | B2 * | 2/2026 | Delarue | F02K 1/32 |
| 2019/0168860 | A1 * | 6/2019 | Esteie | B64C 5/18 |

FOREIGN PATENT DOCUMENTS

| | | | |
|---|---|---|---|
| EP | 4173960 | A1 | 5/2023 |
| FR | 3108949 | B1 | 10/2021 |

OTHER PUBLICATIONS

Search Report issued in French Application No. 2407860, issued Jan. 15, 2025.

* cited by examiner

*Primary Examiner* — Sang K Kim
(74) *Attorney, Agent, or Firm* — Bookoff McAndrews, PLLC

(57) ABSTRACT

Support mast for a turbojet engine including a movable fairing extending from a trailing edge and a distal end of the mast and configured to move, in the axial direction, together with a movable cowl of a nacelle of the turbojet engine, between a closed position and an open position, and one or more connecting rods, each hinged on a ball joint at each end, to connect the movable fairing of the mast to the movable cowl of the nacelle.

10 Claims, 10 Drawing Sheets

[Fig. 1]
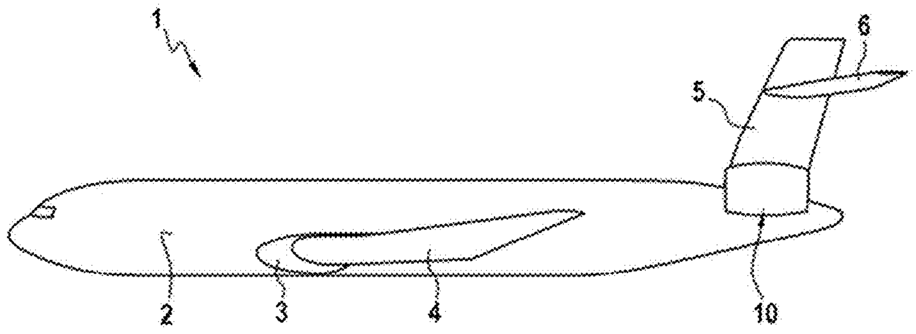
[Fig. 2]
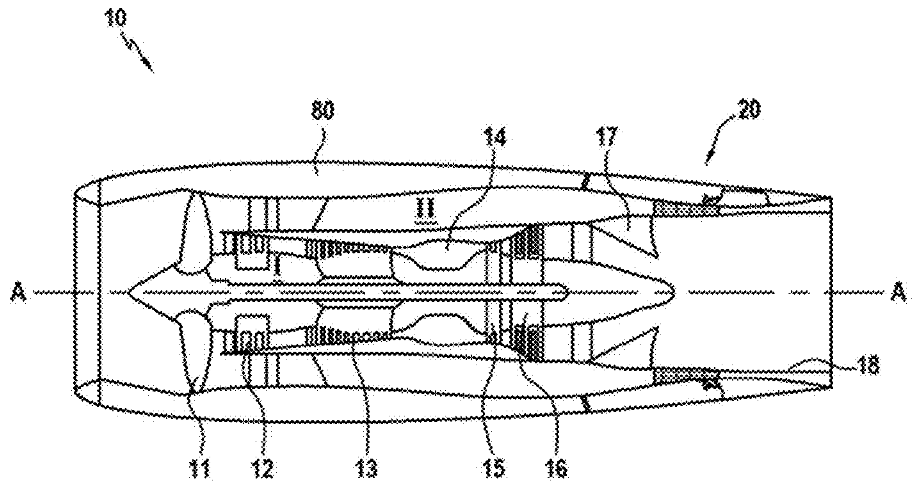

[Fig. 3]
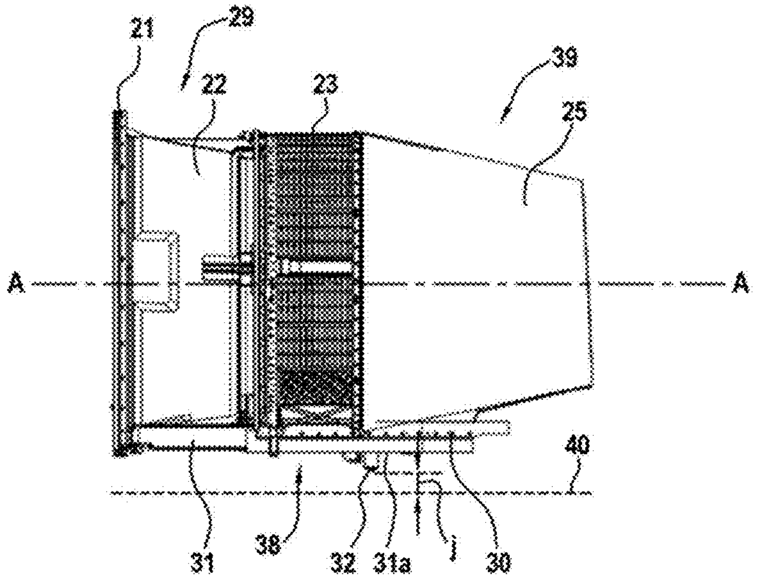
[Fig. 4]
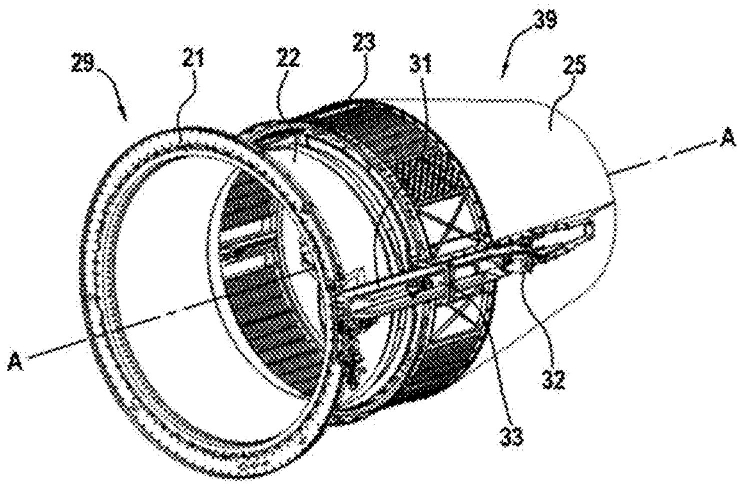

[Fig. 5]
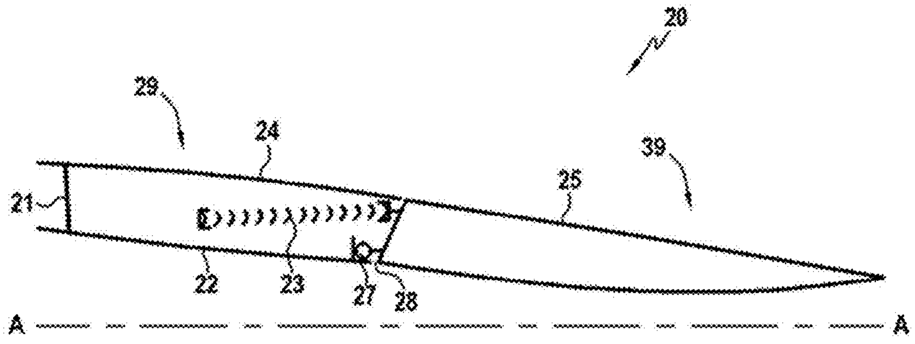
[Fig 6]
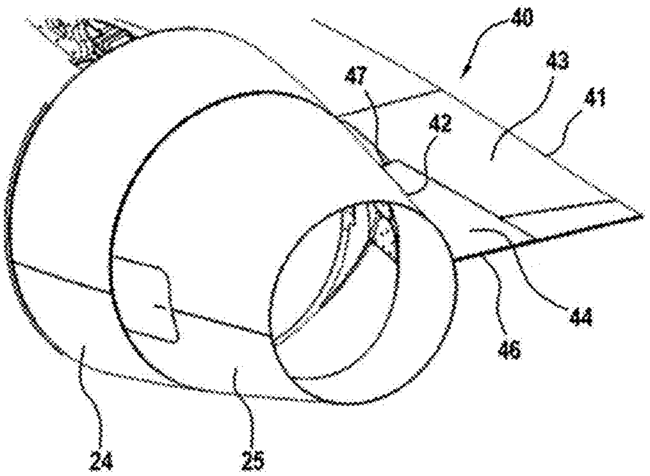

[Fig. 7A]
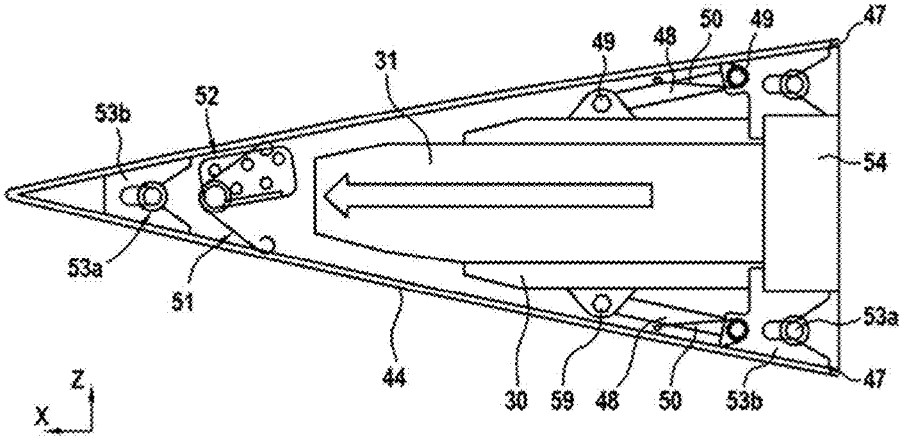
[Fig. 7B]
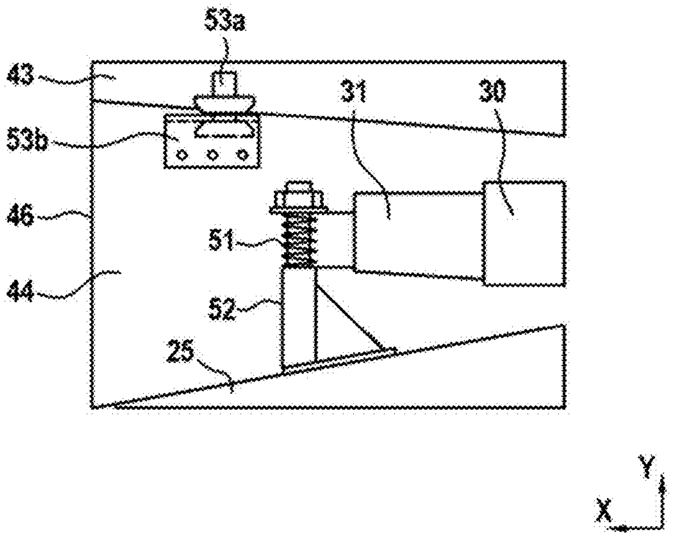

[Fig. 7C]
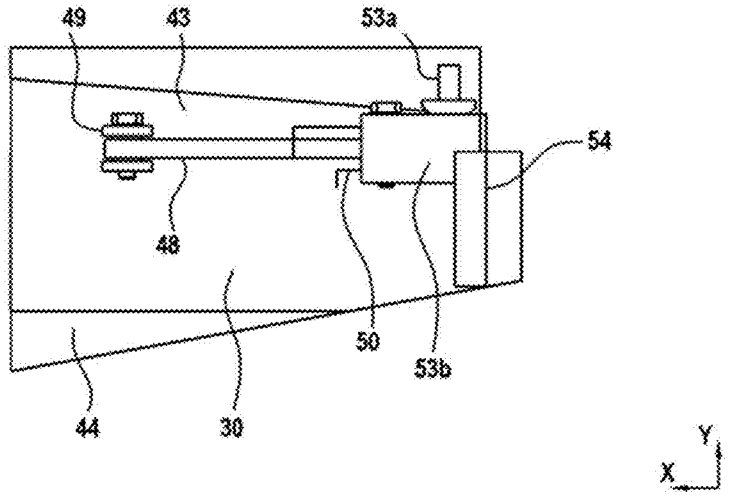
[Fig. 7D]
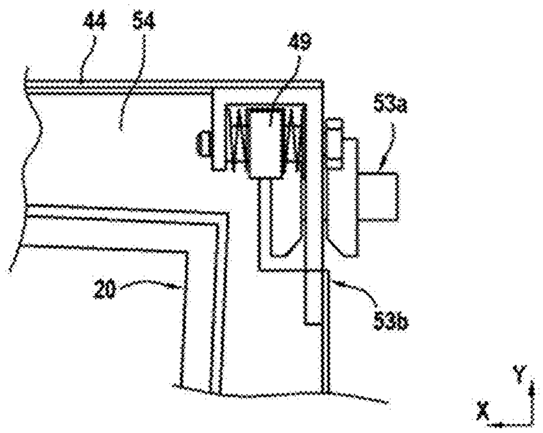

[Fig. 7E]
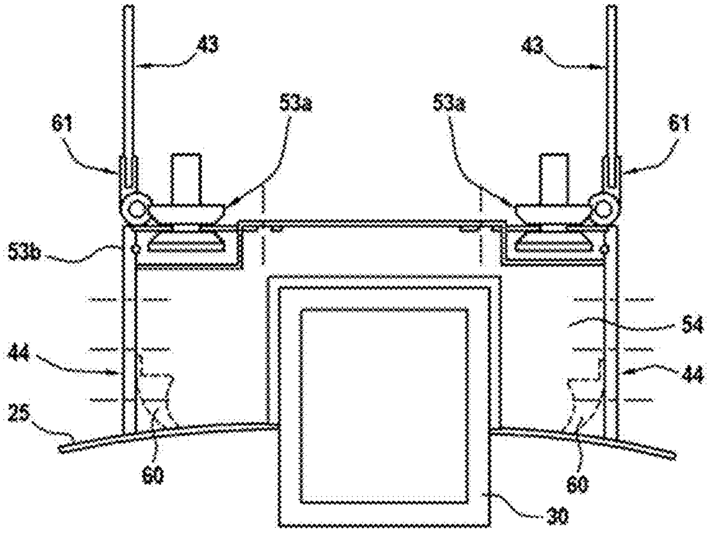
[Fig. 8A]
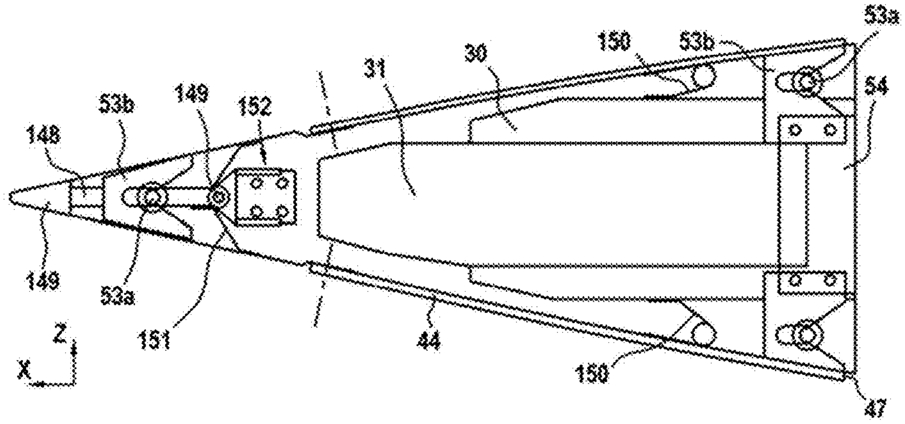

[Fig. 8B]
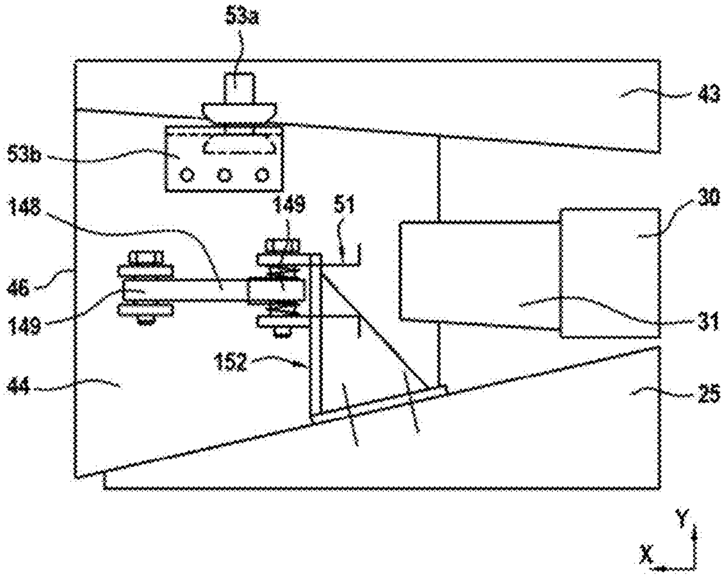
[Fig. 8C]
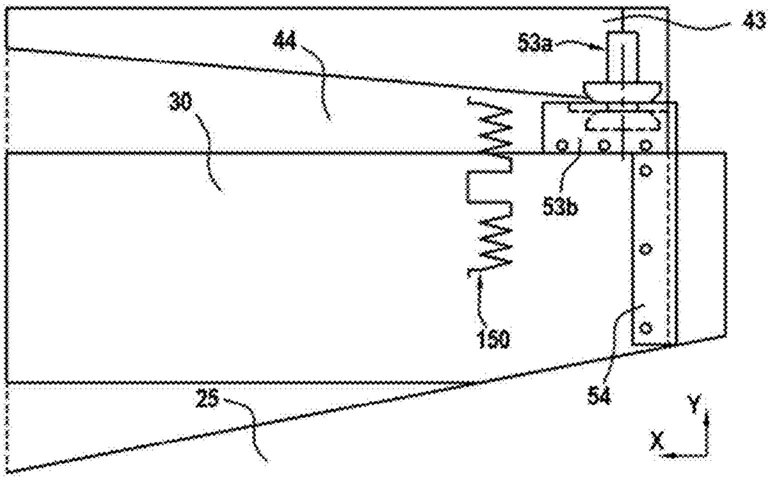

[Fig. 9A]
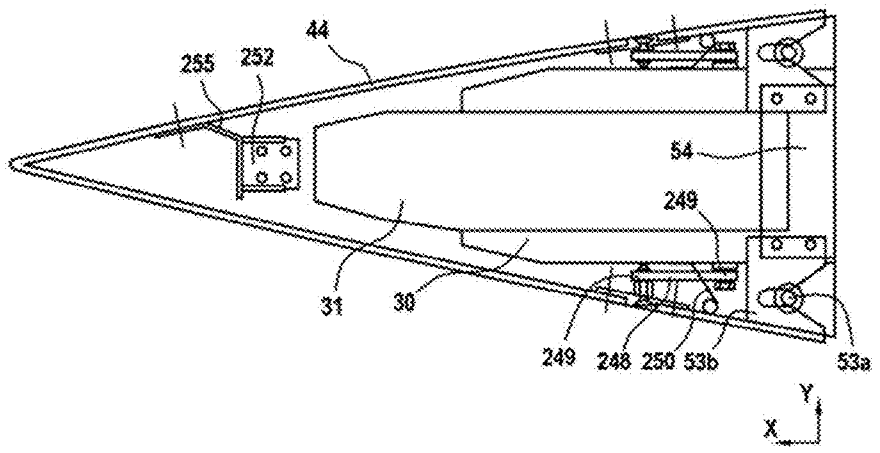
[Fig. 9B]
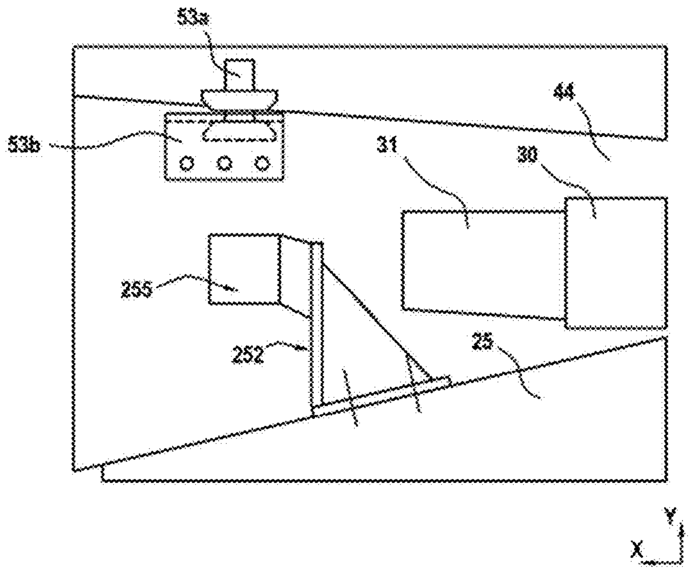

[Fig. 9C]
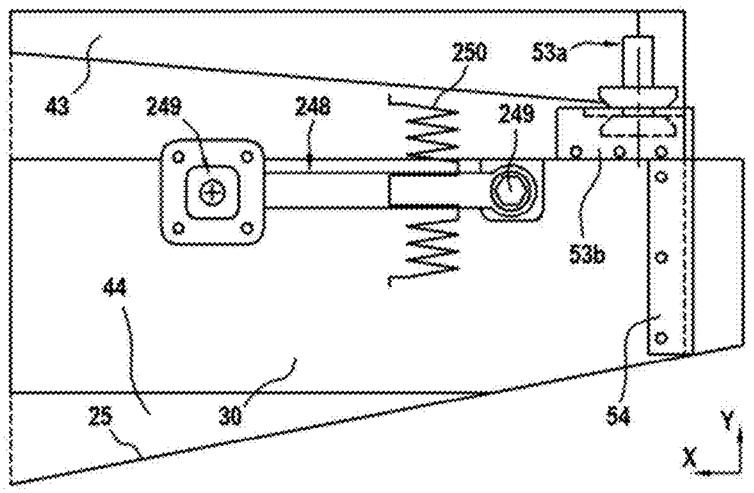
[Fig. 10A]
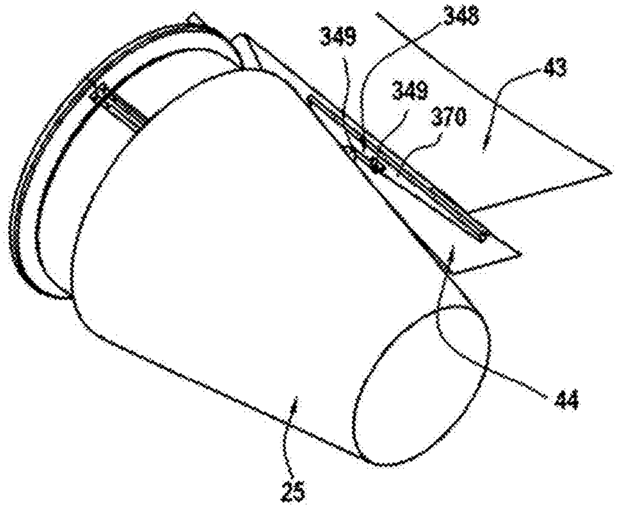

[Fig. 10B]
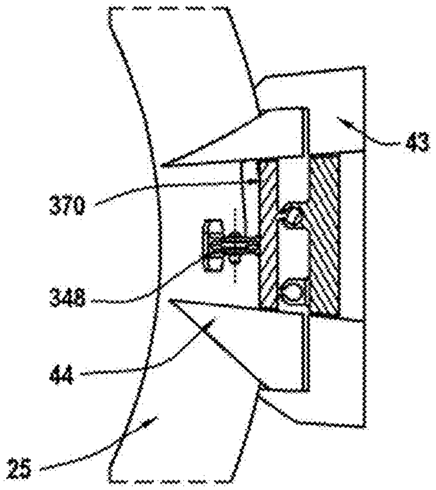

SUPPORT MAST FOR A TURBOJET ENGINE WITH THRUST REVERSER

CROSS-REFERENCE OT RELATED APPLICATIONS

This application claims the benefit of priority from French Application No. 2407860, filed on Jul. 18, 2024, which is incorporated by reference herein in its entirety

TECHNICAL FIELD

The present disclosure relates to a support mast for a turbojet engine, as well as an assembly comprising such a support mast.

PRIOR ART

Climate change is a major concern for many legislative and regulatory bodies around the world. Indeed, various carbon emission restrictions have been, are being or will be adopted by various states. Particularly, an ambitious standard applies to both new types of airplanes and those currently in operation, requiring the implementation of technological solutions in order to make them compliant with current regulations. For several years now, civil aviation has been mobilizing to contribute to the fight against climate change.

Technological research efforts have already led to very significant improvements in the environmental performance of aircraft. The Applicant takes into account the impacting factors in all phases of design and development to obtain more energy-efficient and environmentally friendly aeronautical components and products, the integration and use of which in civil aviation have moderate environmental consequences, with the aim of improving airplane energy efficiency.

Consequently, the Applicant is constantly working to reduce its negative climate impact by using virtuous development and manufacturing methods and processes that minimize greenhouse gas emissions to the minimum possible in order to reduce the environmental footprint of their activity.

These supported research and development works focus on the new generations of airplane engines, the weight reduction of aircraft, in particular through the materials used and the lighter onboard equipment, the development of the use of electric technologies to ensure the propulsion and, as an essential supplement to technological progress, the aviation biofuels.

As part of this research, the Applicant has focused in particular on reducing the weight and parasitic drag associated with the thrusters, and particularly those of the nacelles and support masts receiving the thrusters. In turbojet engines equipped with cascade reversers, in which at least part of the working medium can be diverted and expelled forward in order to slow down the forward movement of the aircraft, or even to make it move backward, the nacelles may include movable cowls moving between a closed position of the reverser cascades and an open position of the reverser cascades, as illustrated for example in patent publication FR 3 108 949 B1. Since these movable cowls are typically located on a posterior portion of the nacelle, converging backward, and since the opening movement of the movable cowls normally takes place backward, it is appropriate to configure the support mast supporting the nacelle in such a way that it does not interfere with this displacement of the movable cowls. A portion of the fairing of the support mast may, for example, move with the movable cowl of the nacelle to avoid this interference.

However, without proper adjustment of the movable portions of the fairing and of the nacelle in their closed position, these risk generating parasitic drag, vibrations and mechanical stresses in flight.

DISCLOSURE OF THE INVENTION

The present disclosure relates to a support mast for a turbojet engine, and more particularly for a turbojet engine with a thrust reverser, in particular a cascade thrust reverser, comprising a supporting structure and an aerodynamic fairing. By “turbojet engine” is meant a gas turbine jet engine, including not only single-flow turbojet engines (or turbojet), but especially fan turbojet engines (or turbofan), in which a significant part, even the greatest part, of the thrust is not generated by the primary stream of combustion gases, but by a secondary stream impelled by a fan driven by the gas turbine. The support mast extends, in the axial direction, from a leading edge to a trailing edge and, in the transverse direction, from a proximal end to a distal end configured to be connected to a thruster nacelle, and more particularly to a nacelle with a movable cowl able to move in the axial direction.

In some embodiments, the support mast comprises a movable fairing extending from the trailing edge and the distal end and configured to move, in the axial direction, together with said movable cowl of the nacelle, between a closed position and an open position, and the mast may further comprise one or more connecting rods, each hinged on a ball joint at each end, to connect the movable fairing of the mast to the movable cowl of the nacelle.

Thanks to the hinged connection by these connecting rods between the aerodynamic fairing of the mast and the movable cowl of the nacelle, it is possible to ensure their joint movement in the axial direction, while preserving a clearance between them in the transverse direction to facilitate their respective adjustment to the adjacent fixed elements in their closed position of the reverser cascades, even under significant mechanical stresses between the nacelle and the mast.

In some embodiments, to facilitate the displacement of the movable fairing of the mast together with the movable cowl of the thruster nacelle, the support mast may further include a slide, guided in the axial direction on the supporting structure and configured to be connected to the movable cowl of the nacelle.

In some embodiments, said one or more connecting rods may be interposed between the movable fairing of the mast and the slide. However, it can also be envisaged, in other embodiments, that said one or more connecting rods are instead configured to be interposed between the slide and the movable cowl of the thruster nacelle. Particularly, said one or more connecting rods may then comprise a connecting rod connected at one end to the slide and configured to be connected at the other end to the movable cowl of the nacelle.

In some embodiments in which said one or more connecting rods are interposed between the movable fairing and the slide, they may comprise two connecting rods, disposed on opposite sides of the support mast, and the mast may further include an additional elastic connection to connect the movable portion of the fairing to the movable cowl of the thruster nacelle or to the slide, so as to maintain their relative centering. The additional elastic connection may in particular be formed by a metal sheet, although other alternatives, such as in particular a preload spring, may be envisaged.

In some embodiments, in particular in order to limit the clearances of the movable portion of the aerodynamic fairing of the mast in the closed position, the mast may further comprise one or more preload springs for the movable fairing and/or one or more locators to transversely center the movable fairing at the end of its stroke toward the closed position.

In some embodiments, in particular in order to limit the dynamic overpressure inside the movable portion of the aerodynamic fairing in the open position, the mast may further comprise an aerodynamic barrier, secured to the movable fairing, disposed transversely upstream of the trailing edge.

The present disclosure also relates to an assembly comprising a turbojet engine, a nacelle surrounding the turbojet engine, with at least one movable cowl able to move in the axial direction between an open position and a closed position, and a support mast as described above, with the distal end connected to the nacelle, as well as an aircraft comprising such an assembly.

In the present disclosure, the terms “axial”, “transverse”, “upstream”, “downstream”, “front” and “rear” are defined relative to the main thrust direction of the turbojet engine.

The aforementioned characteristics and advantages, as well as others, will become apparent upon reading the following detailed description of exemplary embodiments of the support mast of the present disclosure. This detailed description refers to the appended drawings.

BRIEF DESCRIPTION OF THE DRAWINGS

The appended drawings are schematic and are intended primarily to illustrate the principles of the disclosure.

In these drawings, from one figure to the next, identical elements (or portions of elements) are identified by the same reference signs. Furthermore, elements (or portions of elements) belonging to different exemplary embodiments but having a similar function are identified in the figures by reference numerals incremented by 100, 200, etc.

FIG. 1 is a side view of one exemplary aircraft.

FIG. 2 is an axial sectional view of one exemplary mixed-flow turbojet engine.

FIG. 3 represents a side view of one exemplary thrust reverser, where the nacelle is partially represented.

FIG. 4 represents a perspective view of this thrust reverser.

FIG. 5 is a sectional view along an axial plane of this thrust reverser.

FIG. 6 is a perspective view of the thrust reverser comprising the outer cowls and bearing on a support mast.

FIG. 7A is a sectional view, in a plane XZ, of a support mast according to a first embodiment.

FIG. 7B is a first partial sectional view, in a plane XY, of the support mast of FIG. 7A.

FIG. 7C is a second partial sectional view, in the same plane XY, of the support mast of FIG. 7A.

FIG. 7D is a partial sectional view, in a plane YZ, of the support mast of FIG. 7A.

FIG. 7E is a sectional view, in a parallel plane YZ, of the support mast of FIG. 7A.

FIG. 8A is a sectional view, in a plane XZ, of a support mast according to a second embodiment.

FIG. 8B is a first partial sectional view, in a plane XY, of the support mast of FIG. 8A.

FIG. 8C is a second partial sectional view, in the same plane XY, of the support mast of FIG. 8A.

FIG. 9A is a sectional view, in a plane XZ, of a support mast according to a third embodiment.

FIG. 9B is a first partial sectional view, in a plane XY, of the support mast of FIG. 9A.

FIG. 9C is a second partial sectional view, in the same plane XY, of the support mast of FIG. 9A.

FIG. 10A is a partial perspective view of a support mast according to a fourth embodiment.

FIG. 10B is a sectional view, in a plane YZ, of the support mast of FIG. 10A.

DESCRIPTION OF THE EMBODIMENTS

To make the disclosure more concrete, exemplary embodiments of turbojet engine support masts are described in detail below, with reference to the appended drawings. It is recalled that the invention is not limited to these examples.

FIG. 1 is a schematic side view of one exemplary aircraft 1, comprising a fuselage 2 from which airfoils 4 laterally extend from the root 3. The aircraft 1 has an empennage at the back, comprising a vertical stabilizer 5 to which two control surfaces 6 are fixed. A turbojet engine 10 is mounted on each side of the fuselage 2, at the back thereof, via a support mast 40.

The exemplary aircraft 1 of FIG. 1 is for illustrative purposes only, and any other arrangement of the structural elements is possible according to the general knowledge of those skilled in the art. Particularly, the turbojet engines 10 are not limited to two, and may be disposed under the airfoil 4 rather than at the back of the fuselage 2.

FIG. 2 shows one example of a fan turbojet engine 10 having a main axis X represented in a dash-dotted line. The air flow in the turbojet engine 10 is represented in the diagram from left to right. The inlet of the turbojet engine 10 has a fan 11 driving the air inside the turbojet engine 10. The air stream is then divided into a primary air stream I and a secondary air stream II. The primary air stream I is compressed successively by a low-pressure compressor 12 and a high-pressure compressor 13, driven respectively by a low-pressure turbine 16 and a high-pressure turbine 15. Between the compressors 12, 13 and the turbines 15, 16 there is a combustion chamber 14 receiving the air compressed by the compressors 12, 13 and into which the fuel is injected in order to carry out the combustion. The combustion gases exit the combustion chamber 14 by driving the turbines 15 and 16 and join, at the outlet, the secondary air stream II, the latter passing through the turbojet engine 10 on the radial periphery of the primary air stream I. A mixer 17 is positioned at the outlet of the turbines 15, 16 in order to promote the mixing of the two gas streams I, II and thus optimize the total thrust of the gases exiting through the nozzle 18, at the rear end of the turbojet engine 10.

The example of the turbojet engine 10 in FIG. 2 is illustrative, and the turbojet engine 10 is not limited to this embodiment.

The turbojet engine 10 is surrounded by a nacelle 80, a rear portion of which comprises a thrust reverser 20, located on a circumference of the turbojet engine 10.

FIGS. 3 and 4 respectively represent side and perspective views of this thrust reverser 20, in which a cowl 24 has not been represented in order to reveal the inner structure of the thrust reverser 20; this cowl 24 will be presented with reference to FIG. 5.

The thrust reverser 20 comprises a fixed portion 29, comprising the fixed parts in the reference frame of the engine, and a movable portion 39, in translation in the axial direction X relative to the fixed portion 29.

The fixed portion 29 comprises a fixing flange 21 for fixing the thrust reverser 20 on a casing of the turbojet engine 10, a fixed casing 22 surrounding a flowpath of the engine, and a fixed cowl 24 (visible in FIG. 5) surrounding the fixed casing 22.

The movable portion 39 is coaxial with the fixed portion 29 and comprises at least one reverser cascade 23, extending over a circumferential contour of the turbojet engine 10, and a movable cowl 25. The movable cowl 25, provided downstream of the cascades 23, is configured to be added, possibly in a sealed manner, against the fixed portion 29 in the closed state. In the closed state, the cascade 23 is located between the casing 22 and the fixed cowl 24. The movable portion further comprises at least one blocking panel forming an obstacle to the stream leaving the engine in order to deflect the air stream through the cascades 23 during the operation of the reverser 20 that is to say in the deployed state.

The thrust reverser comprises an actuation device 38, comprising a beam 31, a slide 30 and a drive device 33. The beam 31 is secured to the fixed portion 29 and extends axially along the outer surface of the fixed portion 29; the slide 30 may be secured to the movable portion 39 and mounted in translation on the beam 31; the drive device 33 makes it possible to drive the movable portion 39 in translation relative to the fixed portion 29, for example by being mounted between the beam 31 and the slide 30.

The drive device 33 takes the form of a single cylinder 33. The action of this cylinder 33 is described with reference to FIG. 5.

FIG. 5 is a section along an axial plane of the thrust reverser 20. Particularly, FIG. 5 represents the cowls 24, 25 and the cascades 23.

When the thrust reverser 20 is not in operation, the movable cowl 25 is added in a sealed manner against the fixed portion 29, thus preventing the passage of air through the cascades 23. The fixed casing 22 thus carries at its downstream end an annular seal 27 against which a border 28 of the movable portion 39 is applied.

The movable portion 39 is mounted in translation in the axial direction X relative to the fixed portion 29 and the action of the drive device 33 allows the thrust reverser 20 to enter a deployed state in which the movable cowl 25 and the cascades 23 are released from the fixed cowl 24 so that an air passage is left between the fixed portion 29 and the movable portion 39. This air passage passes through the cascades 23, the orientation of which makes it possible to redirect the air stream upstream, and thus slow down the aircraft 1.

When the thrust reverser 20 is in operation, the forward ejection of gases causes a rearward thrust on the thrust reverser 20, which is transmitted to the turbojet engine 10 by the drive device 33 in order to slow down the aircraft 1.

As illustrated in FIG. 6, the turbojet engine 10 and the nacelle 80 are connected to the fuselage 2 or to the airfoil 4 by the support mast 40, which extends in the transverse direction Y from a proximal end 41 to a distal end 42 and, in the axial direction X, from a leading edge (not illustrated) to a trailing edge 46. The mast 40 comprises a fixed portion 43, connected, at the distal end 42 of the mast 40, to the nacelle 80 and/or to the turbojet engine 10. However, in order to avoid mechanical interference of the mast 40 with the movable cowl 25 when the thrust reverser 20 passes into the deployed state, the mast 40 also comprises a movable fairing 44, extending from the trailing edge 46 and the distal end 42, configured to move in the axial direction X, together with the movable cowl 25, relative to the fixed portion 43 of the mast 40, between an open position and a closed position in which upstream edges 47 of the movable fairing 44 close in a sealed manner against the fixed portion of the mast 40.

For that, according to a first embodiment illustrated in detail in FIGS. 7A to 7E, the mast 40 also comprises two connecting rods 48, disposed on both sides of the mast 40, each hinged on a corresponding ball joint 49 at each end, so as to be able to pivot about each axis perpendicular to the longitudinal axis of the connecting rod 48. In each connecting rod 48, one end is connected, through the corresponding ball joint 49, to a clevis added onto the slide 30, and another end, through the corresponding ball joint 49, to a clevis secured to the movable fairing 44, so as to transmit the movement in the axial direction X of the movable cowl 25 to the movable fairing 44.

In order to restrict the transverse travel of the movable fairing 44, the mast 40 may also comprise preload springs. Thus, in this first embodiment, torsional preload springs 50 are disposed at the hinges between each connecting rod 48 and a corresponding side of the movable fairing 44. Another preload spring 51 is disposed, downstream of the connecting rods 48, between a fitting 52 secured to the movable cowl 25 and the two opposite sides of the movable fairing 44, thus forming an additional elastic connection between them. Moreover, in order to ensure good centering of the movable fairing 44, in at least one of the transverse directions Y and Z, at the end of the closing stroke, the mast 40 may also comprise locators 53 each formed by a stop 53*a* and a guide 53*b*, configured to cooperate with the stop 53*a*, with converging contact surfaces in the axial direction X. As illustrated in FIGS. 7A to 7E, the stops 53*a* may be secured to the fixed portion 43 of the mast 40, and the guides 53*b* secured to the movable fairing 44, but it can also be envisaged to reverse this arrangement. As illustrated, two of the locators 53 may be disposed adjacent to the upstream edges 47 of the movable fairing 44, and a third locator 53 may be disposed adjacent to the trailing edge 46. Seals 60 may ensure the sealing between the movable fairing 44 and the movable cowl 25, while other seals 61 may ensure the sealing between the movable fairing 44 in the closed position and the fixed portion 43 of the mast 40.

Thus, in operation, when the thrust reverser 20 enters the deployed state under the action of the drive device 33, the movable fairing 44 is pushed, in the axial direction X, by the slide 30 and the connecting rods 48, thus moving in this direction together with the movable cowl 25 towards its open position. In this deployed state, the springs 50 and 51 restrict the transverse travel of the movable fairing 44 relative to the fixed portion 43 of the mast 40. When the thrust reverser 20 returns to the closed state under the action of the drive device 33, the movable fairing 44 is pulled, in the axial direction X, by the slide 30 and the connecting rods 48, thus moving in this direction together with the movable cowl 25 towards its closed position. Upon reaching the end of stroke towards this closed position, the converging surfaces of the guides 53*b* will engage the stops 53*a* to center the movable fairing 44 in the transverse direction and thus ensure a good adjustment and sealing of the edges 47 of the movable fairing 44 against the fixed portion 43 of the mast 40.

When the thrust reverser 20 enters the deployed state and the movable fairing 44 moves, together with the movable cowl 25, to an open position, thereby opening a gap between the upstream edges 47 of the movable fairing 44 and the fixed portion 43 of the mast 40, air can enter through this gap. If the aircraft 1 then advances at a significant speed, the relative wind rushing through this opening could generate significant dynamic pressure inside the movable fairing 44 and, consequently, additional mechanical stresses on it. In order to avoid this, the mast 40 may also include an aerodynamic barrier 54 secured to the movable fairing 44, and which may in particular take the form of a metal sheet, disposed transversely upstream of the trailing edge 46, for example adjacent to the upstream edges 47.

A second embodiment is illustrated in detail in FIGS. 8A to 8C. In this second embodiment, the mast 40 comprises a single connecting rod 148, located adjacent to the trailing edge 46 and hinged on a corresponding ball joint 149 at each end, so as to be able to pivot around each axis perpendicular to the longitudinal axis of the connecting rod 148. In this connecting rod 148, one end is connected, through the corresponding ball joint 149, to a fitting 152 secured to the movable cowl 25, and another end is connected, through the corresponding ball joint 149, to a clevis added, possibly machined, onto the movable fairing 44, so as to transmit the movement in the axial direction X of the movable cowl 25 to the movable fairing 44.

In order to restrict the transverse travel of the movable fairing 44, the mast 40 may also comprise preload springs. Thus, in this second embodiment, torsional preload springs 150 are disposed between each side of the slide 30 and a corresponding side of the movable fairing 44. In a manner similar to the first embodiment, another preload spring 51 is disposed between the fitting 152 and the two opposite sides of the movable fairing 44, so as to form an additional elastic connection between them. Moreover, in order to ensure good centering of the movable fairing 44, in at least one of the transverse directions Y and Z, at the end of the closing stroke, the mast 40 may also comprise locators 53 each formed by a stop 53*a* and a guide 53*b*, configured to cooperate with the stop 53*a*, with converging contact surfaces in the axial direction X. As illustrated in FIGS. 8A, 8B and 8C, the stops 53*a* may be secured to the fixed portion 43 of the mast 40, and the guides 53*b* secured to the movable fairing 44, but it can also be envisaged to reverse this arrangement. As in the first embodiment, two of the locators 53 may be disposed adjacent to the upstream edges 47 of the movable fairing 44, and a third locator 53 may be disposed adjacent to the trailing edge 46. As in the first embodiment, the mast 40 may also include an aerodynamic barrier 54 secured to the movable fairing 44, and may in particular take the form of a metal sheet, disposed transversely upstream of the trailing edge 46, for example adjacent to the upstream edges 47, to limit the dynamic overpressures inside the movable fairing 44.

Thus, in operation, when the thrust reverser 20 enters the deployed state under the action of the drive device 33, the movable fairing 44 is pushed, in the axial direction X, by the movable cowl 25 and the connecting rod 148, thus moving in this direction together with the movable cowl 25 towards its open position. In this deployed state, the springs 150 and 151 restrict the transverse travel of the movable fairing 44 relative to the fixed portion 43 of the mast 40. When the thrust reverser 20 returns to the closed state under the action of the drive device 33, the movable fairing 44 is pulled, in the axial direction X, by the movable cowl and the connecting rod 148, thus moving in this direction together with the movable cowl 25 towards its closed position. Upon reaching the end of stroke towards this closed position, the converging surfaces of the guides 53*b* will engage the stops 53*a* to center the movable fairing 44 in the transverse direction and thus ensure a good adjustment and sealing of the edges 47 of the movable fairing 44 against the fixed portion 43 of the mast 40.

A third embodiment is illustrated in detail in FIGS. 9A to 9C. In this third embodiment, the mast 40 comprises two connecting rods 248, disposed on both sides of the mast 40, each hinged on a corresponding ball joint 249 at each end, so as to be able to pivot about each axis perpendicular to the longitudinal axis of the connecting rod 248, as in the first embodiment. In a manner similar to the first embodiment, one end of each connecting rod 248 is connected, through the corresponding ball joint 249, to the slide 30, and another end of each connecting rod 248, through the corresponding ball joint 249, to the movable fairing 44, so as to transmit the movement in the axial direction X of the movable cowl 25 to the movable fairing 44.

In order to restrict the transverse travel of the movable fairing 44, the mast 40 may also comprise preload springs. Thus, in this third embodiment, torsional preload springs 250 are disposed, as in the second embodiment, between each side of the slide 30 and a corresponding side of the movable fairing 44. Furthermore, a flexible metal sheet 255, for example made of titanium, and which may have a thickness of for example 1 mm, connects to the movable fairing 44 a fitting 252 secured to the movable cowl 25, thus forming an additional elastic connection between the movable fairing 44 and the movable cowl 25. Moreover, in order to ensure good centering of the movable fairing 44, in at least one of the transverse directions Y and Z, at the end of the closing stroke, the mast 40 may also comprise locators 53 each formed by a stop 53*a* and a guide 53*b*, configured to cooperate with the stop 53*a*, with converging contact surfaces in the axial direction X. As illustrated in FIGS. 7A, 7B and 7C, the stops 53*a* may be secured to the fixed portion 43 of the mast 40, and the guides 53*b* secured to the movable fairing 44, but it can also be envisaged to reverse this arrangement. As illustrated, two locators 53 may be disposed adjacent to the upstream edges 47 of the movable fairing 44.

Thus, in operation, when the thrust reverser 20 enters the deployed state under the action of the drive device 33, the movable fairing 44 is pushed, in the axial direction X, by the slide 30 and the connecting rods 248, thus moving in this direction together with the movable cowl 25 towards its open position. In this deployed state, the springs 250 and the flexible metal sheet 255 restrict the transverse travel of the movable fairing 44 relative to the fixed portion 43 of the mast 40. When the thrust reverser 20 returns to the closed state under the action of the drive device 33, the movable fairing 44 is pulled, in the axial direction X, by the slide 30 and the connecting rods 48, thus moving in this direction together with the movable cowl 25 towards its closed position. Upon reaching the end of stroke towards this closed position, the converging surfaces of the guides 53*b* will engage the stops 53*a* to center the movable fairing 44 in the transverse direction and thus ensure a good adjustment and sealing of the edges 47 of the movable fairing 44 against the fixed portion 43 of the mast 40.

A fourth embodiment is illustrated in detail in FIGS. 10A and 10B. In this second embodiment, the mast 40 comprises a single connecting rod 348, hinged on a corresponding ball joint 349 at each end, so as to be able to pivot around each axis perpendicular to the longitudinal axis of the connecting rod 348. In this connecting rod 348, one end is connected, through the corresponding ball joint 349, to the movable cowl 25, and another end is connected, through the corresponding ball joint 349, to a slide 370 which, in this fourth embodiment, is secured to the movable fairing 44, so as to transmit the movement in the axial direction X of the movable cowl 25 to the movable fairing 44 through the connecting rod 348 and the slide 370. In this fourth embodiment, the mast 40 may also incorporate locators and/or preload springs to ensure a good adjustment of the movable fairing 44 at the end of the closing stroke.

Thus, in operation, when the thrust reverser 20 enters the deployed state under the action of the drive device 33, the slide 370 is pushed, with the movable fairing 44, in the axial direction X by the connecting rod 348, thus moving in this direction together with the movable cowl 25 towards the open position of the movable fairing 44. When the thrust reverser 20 returns to the closed state under the action of the drive device 33, the slide 370 is pulled, with the movable fairing 44, in the axial direction X by the connecting rod 348, thus moving in this direction together with the movable cowl 25 towards the closed position of the movable fairing 44.

Although the present invention has been described with reference to specific exemplary embodiments, it is obvious that modifications and changes may be made to these examples without departing from the general scope of the invention as defined by the claims. Particularly, individual characteristics of the various illustrated/mentioned embodiments may be combined in additional embodiments. Consequently, the description and drawings should be considered in an illustrative rather than restrictive sense.

The invention claimed is:

1. A support mast for a turbojet engine, said support mast extending, in an axial direction, from a leading edge to a trailing edge and, in a transverse direction, from a proximal end to a distal end configured to be connected to a nacelle including a movable cowl able to move in translation in the axial direction, and said support mast comprising:

a movable fairing extending from the trailing edge and the distal end and configured to move, in the axial direction, together with said movable cowl of the nacelle, between a closed position and an open position, and one or more connecting rods, each hinged on a ball joint at each end, to connect the movable fairing of the mast to the movable cowl of the nacelle.

2. The support mast according to claim 1, further including a slide, guided in the axial direction and configured to be connected to the movable cowl of the nacelle.

3. The support mast according to claim 2, wherein said one or more connecting rods are interposed between the movable fairing and the slide.

4. The support mast according to claim 3, wherein said one or more connecting rods comprise two connecting rods, disposed on opposite sides of the support mast, and further including an additional elastic connection such as, for example, a flexible metal sheet or a spring, to connect the movable fairing to the movable cowl or to the slide.

5. The support mast according to claim 2, wherein said one or more connecting rods comprise a connecting rod connected at one end to the slide and configured to be connected at the other end to the movable cowl of the nacelle.

6. The support mast according to claim 1, further comprising one or more preload springs for the movable fairing.

7. The support mast according to claim 1, further comprising one or more locators to transversely center the movable fairing at the end of its stroke towards the closed position.

8. The support mast according to claim 1, further comprising an aerodynamic barrier, secured to the movable fairing, disposed transversely upstream of the trailing edge.

9. An assembly comprising a turbojet engine, a nacelle surrounding the turbojet engine, with at least one movable cowl able to move in the axial direction between an open position and a closed position, and the support mast according to claim 1, with the distal end connected to the nacelle.

10. An aircraft comprising the assembly according to claim 9.

* * * * *